United States Patent
Xu et al.

(10) Patent No.: US 11,540,292 B2
(45) Date of Patent: Dec. 27, 2022

(54) CHANNEL RESOURCE ALLOCATION METHOD AND APPARATUS

(71) Applicant: Huawei Technologies Co., Ltd., Shenzhen (CN)

(72) Inventors: Han Xu, Shenzhen (CN); Yan Zeng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 16/773,453

(22) Filed: Jan. 27, 2020

(65) Prior Publication Data

US 2020/0163089 A1  May 21, 2020

Related U.S. Application Data

(63) Continuation of application No. PCT/CN2017/094278, filed on Jul. 25, 2017.

(51) Int. Cl.
*H04W 16/28* (2009.01)
*H04W 72/04* (2009.01)
(Continued)

(52) U.S. Cl.
CPC .............. *H04W 72/08* (2013.01); *H04L 5/14* (2013.01); *H04W 76/15* (2018.02)

(58) Field of Classification Search
CPC .. H04B 7/0617; H04B 7/0408; H04B 7/0897; H04W 76/15; H04W 48/10; H04W 72/0446; H04L 65/80
(Continued)

(56) References Cited

U.S. PATENT DOCUMENTS

2003/0179756 A1  9/2003 Cain
2008/0268862 A1  10/2008 Kent et al.
(Continued)

FOREIGN PATENT DOCUMENTS

CN        1788432 A    6/2006
CN      101325443 A   12/2008
(Continued)

OTHER PUBLICATIONS

IEEE Std 802.11, "Part 11: Wireless LAN Medium Access Control (MAC) and Physical Layer (PHY) Specifications," (Revision of IEEE Std 802. Nov. 2012), IEEE Computer Society, 2016, 3534 pages.
(Continued)

*Primary Examiner* — Khaled M Kassim
*Assistant Examiner* — Jason A Harley
(74) *Attorney, Agent, or Firm* — Conley Rose, P.C.

(57) ABSTRACT

A channel resource allocation method and apparatus, where the method includes: establishing, by a first network device, at least two links between the first network device and a second network device, where each link supports beamforming data transmission; obtaining, by the first network device, a millimeter-wave radio channel resource between the first network device and the second network device; dividing the millimeter-wave radio channel resource into a plurality of slots, where each slot is used for data transmission on one link, and where two adjacent slots correspond to two different links; and transmitting, by the first network device, data on a corresponding link in the plurality of slots.

20 Claims, 10 Drawing Sheets

(51) Int. Cl.
| | |
|---|---|
| *H04B 7/0408* | (2017.01) |
| *H04B 7/06* | (2006.01) |
| *H04L 5/00* | (2006.01) |
| *H04B 7/155* | (2006.01) |
| *H04W 72/08* | (2009.01) |
| *H04W 76/15* | (2018.01) |
| *H04L 5/14* | (2006.01) |

(58) Field of Classification Search
USPC .............................................. 455/41.2, 63.4
See application file for complete search history.

(56) References Cited

U.S. PATENT DOCUMENTS

| | | | |
|---|---|---|---|
| 2008/0310380 A1 | 12/2008 | Wullich et al. | |
| 2013/0095770 A1* | 4/2013 | Moshfeghi | H04W 24/08 455/73 |
| 2015/0009951 A1* | 1/2015 | Josiam | H04L 5/0051 370/330 |
| 2015/0288558 A1* | 10/2015 | Gates | G06F 11/0769 714/57 |
| 2015/0382268 A1* | 12/2015 | Hampel | H04W 36/24 455/436 |
| 2016/0006122 A1* | 1/2016 | Seol | H01Q 3/24 342/372 |
| 2016/0087877 A1* | 3/2016 | Ryu | H04L 45/22 370/329 |
| 2016/0088558 A1 | 3/2016 | Chu et al. | |
| 2016/0190686 A1* | 6/2016 | Gao | H01Q 3/24 342/374 |
| 2016/0353510 A1 | 12/2016 | Zhang et al. | |
| 2017/0026093 A1* | 1/2017 | Kim | H04B 7/022 |
| 2017/0041100 A1 | 2/2017 | Xie et al. | |
| 2017/0054479 A1 | 2/2017 | Sang et al. | |
| 2017/0142702 A1* | 5/2017 | Yu | H04W 72/0406 |
| 2017/0238305 A1* | 8/2017 | Chen | H04W 72/0446 370/311 |
| 2017/0251471 A1* | 8/2017 | Jeong | H04W 52/0219 |
| 2018/0091267 A1* | 3/2018 | Kim | H04L 27/2602 |
| 2018/0146439 A1* | 5/2018 | Kim | H04W 52/322 |
| 2018/0219654 A1* | 8/2018 | Chen | H04W 72/048 |
| 2018/0359790 A1* | 12/2018 | Ingale | H04W 28/16 |
| 2019/0014569 A1* | 1/2019 | Abedini | H04W 72/0406 |
| 2019/0021106 A1* | 1/2019 | Oteri | H04L 1/0006 |
| 2019/0068255 A1* | 2/2019 | Bolotin | H04W 52/0225 |
| 2019/0281624 A1* | 9/2019 | Kim | H04W 74/0833 |

FOREIGN PATENT DOCUMENTS

| | | |
|---|---|---|
| CN | 101753274 A | 6/2010 |
| CN | 104618964 A | 5/2015 |
| CN | 104753627 A | 7/2015 |
| WO | 2017058568 A1 | 4/2017 |

OTHER PUBLICATIONS

IEEE Std 802.11ad, "Part 11: Wireless LAN Medium Access Control (MAC) and Physical Layer (PHY) Specifications, Amendment 3: Enhancements for Very High Throughput in the 60 GHz Band," IEEE Computer Society, Dec. 28, 2012, 628 pages.

Park, M., "A Spatial Diversity Technique for IEEE 802.llad WLAN in 60 GHz Band," IEEE Communications Letters, IEEE Servicecenter, Piscataway, NJ, US, vol. 16, No. 8, XP011456746, Aug. 1, 2012, pp. 1260-1262.

Sadri, A., "mmWave Technology Evolution From WiGig to 5G Small Cells," WiGig Alliance, Jun. 2013, 33 pages.

Park, M., et al, "A Spatial Diversity Technique for IEEE 802.11ad WLAN in 60 GHz Band", IEEE Communications Letters, vol. 16, No. 8, Aug. 2012, total 3 pages.

InterDigital Communications,"Robust and Efficient Beam Management for NR", 3GPP TSG RAN WG1 Meeting #86bis, R1-1610345, Lisbon, Portugal Oct. 10-14, 2016, total 4 pages.

Huawei et al,"Multi-beam transmission for robustness", 3GPP TSG RAN WG1 Meeting #89, R1-1708136, Hangzhou, China, May 15-19, 2017, total 5 pages.

* cited by examiner

CHANNEL RESOURCE ALLOCATION METHOD AND APPARATUS

CROSS-REFERENCE TO RELATED APPLICATIONS

This application is a continuation of International Patent Application No. PCT/CN2017/094278, filed on Jul. 25, 2017, the disclosure of which is hereby incorporated by reference in its entirety.

TECHNICAL FIELD

This application relates to the field of millimeter-wave communications technologies, and in particular, to a channel resource allocation method and apparatus.

BACKGROUND

As emerging services such as virtual reality (VR) and high-definition video develop and a quantity of access devices increases, an existing wireless communications technology gradually cannot meet a high bandwidth requirement. Therefore, the industry focuses on millimeter-wave communication because there is a grant-free spectrum up to dozens of gigahertz (GHz) in a millimeter-wave communication field. In addition, as shown in FIG. 1, in the United States, the European Union, and Japan, 57 GHz to 66 GHz frequency bands are classified into contiguous grant-free spectrums. However, because of a physical property of a millimeter wave, a loss in a path transmission process is very large. For example, a path loss of a 60 GHz millimeter wave in free space is 21 decibels (dB) more than a path loss of a 5 GHz frequency band. In addition, limited by a very short wavelength, the millimeter wave is greatly affected by a block in practice.

To compensate for a large amount of loss of the millimeter wave in a transmission process, a transmit/receive antenna array is mainly designed in a solution in the millimeter-wave communication field in the industry. Energy is concentrated in a specific direction through beamforming of the antenna array, to compensate for the transmission loss using a relatively high antenna gain. However, in addition to an advantage of the high antenna gain, the antenna array and the beamforming also bring some constraints. For example, if a sending party and a receiving party need to concentrate the energy in a relatively narrow direction, beamforming directions of the sending party and the receiving party need to be first aligned before communication. In addition, because beamforming is highly directional, a transmission path between the sending party and the receiving party needs to be unblocked.

However, in practice, it is usually inevitable that the transmission path is blocked. If a current transmission path is blocked or faulty, a system needs to reselect a path, and complete switching to the path and data transmission. In the path switching process, a disastrous delay may be brought to an upper-layer service and quality of service of a user is affected.

SUMMARY

This application provides a channel resource allocation method, which is applied to a millimeter-wave communications field in which beamforming is implemented, and is used to reduce a high delay caused by transmission path switching.

According to a first aspect, this application provides a channel resource allocation method. The method includes: establishing, by a first network device, at least two links between the first network device and a second network device, where each link supports beamforming data transmission; obtaining, by the first network device, a millimeter-wave radio channel resource between the first network device and the second network device; dividing the radio channel resource into a plurality of slots, where each slot is used for data transmission on one link, and two adjacent slots correspond to two different links; and transmitting, by the first network device, data on a corresponding link in the plurality of slots.

According to the method provided in this aspect, the first network device divides the millimeter-wave radio channel resource into a plurality of slots, and different slots are used for data transmission on different links. Therefore, when it is detected that a link at a current moment is faulty, data may be transmitted using a next slot, such that the link is quickly switched to a link that is not faulty. In this way, a process of link reselection, switching, and connection establishment is avoided, a delay caused by link switching is reduced, and quality of service of a user is improved.

In addition, when a fault occurs, compared with a manner in which time-frequency resources of an entire radio channel are allocated to one link for data transmission, in the method in this aspect, a link can be quickly switched to change a direction of beamforming using a divided slot, such that the time-frequency resources corresponding to the entire link are not wasted due to a fault. According to the method, a delay is reduced and a time-frequency resource of a system is saved at the same time.

With reference to the first aspect, in an implementation of the first aspect, a process in which the first network device divides the radio channel resource into a plurality of slots includes dividing, by the first network device, the channel resource into a plurality of slots in a time division duplex TDD manner.

With reference to the first aspect, in another implementation of the first aspect, transmitting, by the first network device, data on a corresponding link in the plurality of slots includes: determining, by the first network device, an optimal link in the at least two links; sending, by the first network device, first information in a slot corresponding to the optimal link, where the first information is used to perform channel estimation and data monitoring on the optimal link; and sending second information in a slot corresponding to a link other than the optimal link, where the second information is used to maintain a heartbeat.

In this implementation, the first network device transmits important data on the optimal link, for example, the first information, and sends the second information on another sub-optimal link, in order to maintain transmissibility of each link. In this way, when the optimal link is faulty subsequently, the first network device can link to another link in a timely manner.

With reference to the first aspect, in still another implementation of the first aspect, the method further includes: obtaining, by the first network device, reference information of the second network device, where the reference information includes at least one of a signal-to-noise ratio (SNR), a packet loss rate, channel state information (CSI), a channel quality indicator (CQI), a data packet transmission delay, or quality of service (QoS) at a system layer and an application layer; and adjusting, by the first network device based on the reference information, a length of a slot allocated to each link.

In this implementation, when a fault occurs, a beamforming link is quickly switched by changing a slot, to avoid reselecting a link to reestablish a connection, such that an upper-layer service can be maintained continuously and without interruption. In addition, the first network device dynamically adjusts time-frequency resources of links in different beamforming directions using the reference information, such that a system delay can be reduced, thereby improving quality of service.

With reference to the first aspect, in still another implementation of the first aspect, obtaining reference information of the second network device includes: obtaining, by the first network device, the reference information by negotiating with the second network device; or obtaining the reference information using a monitoring result of quality of each link. In addition, the reference information may be obtained in another manner. This is not limited in this application.

With reference to the first aspect, in still another implementation of the first aspect, the at least two links include a first link and a second link. Additionally, adjusting, by the first network device based on the reference information, a length of a slot allocated to each link includes determining, by the first network device based on the reference information, that when the first link is faulty, a slot allocated to the first link is changed to a slot corresponding to the second link.

With reference to the first aspect, in still another implementation of the first aspect, establishing, by a first network device, at least two links between the first network device and a second network device includes: broadcasting, by the first network device, a first message, where the first message includes capabilities of a plurality of beamforming links supported by the first network device; receiving, by the first network device, a response message fed back by the second network device based on the first message; and establishing, by the first network device, the at least two links to the second network device based on the response message.

With reference to the first aspect, in still another implementation of the first aspect, the second network device includes at least two virtual second network devices. Additionally, establishing, by a first network device, at least two links between the first network device and a second network device includes establishing, by the first network device, a link between the first network device and each virtual second network device.

In this implementation, the second network device forms a plurality of virtual network devices such as stations (STAs) by extending a plurality of medium access control (MAC) addresses. These virtual network devices appear as different devices for the first network device such as an access point (AP). At an AP link layer, the AP and a plurality of virtual STAs separately train links. Therefore, code at the AP link layer does not need to be changed, such that the AP link layer can be quickly compatible with an existing standard, to maintain barrier-free communication between the AP and each virtual STA.

With reference to the first aspect, in still another implementation of the first aspect, the first network device includes at least one antenna array. Additionally, transmitting, by the first network device, data on a corresponding link in the plurality of slots includes: transmitting, by the first network device, data using one antenna array, or transmitting data to the second network device using two or more antenna arrays, where a transmission mechanism between the two or more antenna arrays includes time division multiplexing, frequency division multiplexing, code division multiplexing, and spatial multiplexing.

In this implementation, single antenna array transmission and multi-group antenna array transmission may be combined to transmit data in a switching manner, in order to establish a multi-link redundancy backup between the first network device and the second network device, thereby improving link quality, such as an SNR and robustness.

With reference to the first aspect, in still another implementation of the first aspect, the foregoing method further includes: broadcasting, by the first network device, a second message, where the second message includes a capability for tracing a plurality of beams supported by the first network device; receiving, by the first network device, a response message fed back by the second network device based on the second message; and tracing, by the first network device, the link based on the response message.

In this implementation, the first network device implements dynamic tracing of a plurality of links using the capability for tracing a plurality of beams supported by the first network device, and maintains transmissibility of the links, in order to prepare for fast link switching.

According to a second aspect, this application further provides a channel resource allocation apparatus. The apparatus includes units or modules configured to perform the method steps in the implementations of the first aspect. Further, the apparatus includes an obtaining unit, a processing unit, a sending unit, and the like. Specifically, the apparatus may be configured in a first network device such as an AP.

According to a third aspect, this application further provides a channel resource allocation method. The method may be applied to a second network device such as a STA. The method includes: establishing, by a second network device, at least two links between the second network device and a first network device, where each link supports beamforming data transmission; and communicating with the first network device based on the at least two established links.

With reference to the third aspect, in another implementation of the third aspect, the method further includes: receiving, by the second network device, information from the first network device; and sending a response message to the first network device based on the information, in order to maintain transmissibility of the plurality of links.

With reference to the third aspect, in still another implementation of the third aspect, maintaining transmissibility of the plurality of links includes: receiving, by the second network device, first information from the first network device, where the first information is used to perform channel estimation and data monitoring on an optimal link; and on another link, receiving second information from the first network device, where the second information includes a preamble or a heartbeat packet/heartbeat frame used to maintain a heartbeat.

With reference to the third aspect, in still another implementation of the third aspect, the method further includes: generating, by the second network, reference information, where the reference information includes at least one of the following: an SNR, a packet loss rate, CSI, a CQI, a data packet transmission delay, or QoS at a system layer and an application layer; and sending the reference information to the first network device.

With reference to the third aspect, in still another implementation of the third aspect, the method further includes: virtualizing, by the second network device, a plurality of network devices, such as STAs, and simultaneously training/tracing a plurality of links using a virtualization technology. Further, the second network device extends a plurality of MAC addresses, each MAC address corresponds to one virtual STA, and each virtual STA can identify different data streams from each other, and externally appears as a plurality of different STAs.

With reference to the third aspect, in still another implementation of the third aspect, the method further includes: receiving, by the second network device, a second message from the first network device; generating a feedback response message based on the second message; and sending the response message to the first network device, in order to implement beam tracing and slot allocation of each link by the first network device.

According to a fourth aspect, this application further provides a channel resource allocation apparatus. The apparatus includes units or modules configured to perform the method steps in the implementations of the third aspect. Further, the apparatus includes a receiving unit, a processing unit, a sending unit, and the like. Specifically, the apparatus may be configured in a second network device such as a STA.

According to a fifth aspect, this application further provides a network device. The network device includes components such as a processor, a memory, and a transceiver. The processor may execute a program or an instruction stored in the memory, to implement the channel resource allocation method according to the implementations of the first aspect.

According to a sixth aspect, this application further provides a computer storage medium. The computer storage medium may store a program, and when the program is executed, some or all of the steps in the embodiments of the channel resource allocation method provided in this application may be included.

According to a seventh aspect, this application further provides a computer program product that includes an instruction. When the computer program product runs on a computer, the computer is enabled to perform the method steps in the foregoing aspects.

BRIEF DESCRIPTION OF DRAWINGS

To describe the technical solutions in this application more clearly, the following briefly describes the accompanying drawings required for describing the embodiments. A person of ordinary skill in the art may derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Before the technical solutions in the embodiments of the present disclosure are described, an application scenario of the embodiments of the present disclosure is first described with reference to the accompanying drawings. The technical solutions provided in the embodiments of this application are applied to the millimeter-wave communications field, and the millimeter-wave communications field includes the following features: First, both a sending party and a receiving party need to concentrate energy in a relatively small direction, and before communication, beamforming directions of the sending party and the receiving party are aligned, such that link transmission has a feature similar to optics. Second, a transmission path, namely, a line of sight (LOS), between the sending party and the receiving party needs to be unblocked.

A method provided in the embodiments of this application is applied to a wireless local access network (WLAN) network. Specifically, the method may be applicable to a Long Term Evolution (LTE) system or a wireless communications system that uses radio access technologies such as code division multiple access and orthogonal frequency division multiple access. In addition, the method may be further applicable to a subsequently evolved system using the LTE system, such as 60G WiFi, a 5th generation (5G) communications system, a new radio (NR) system, and an optical system.

Figure 1:
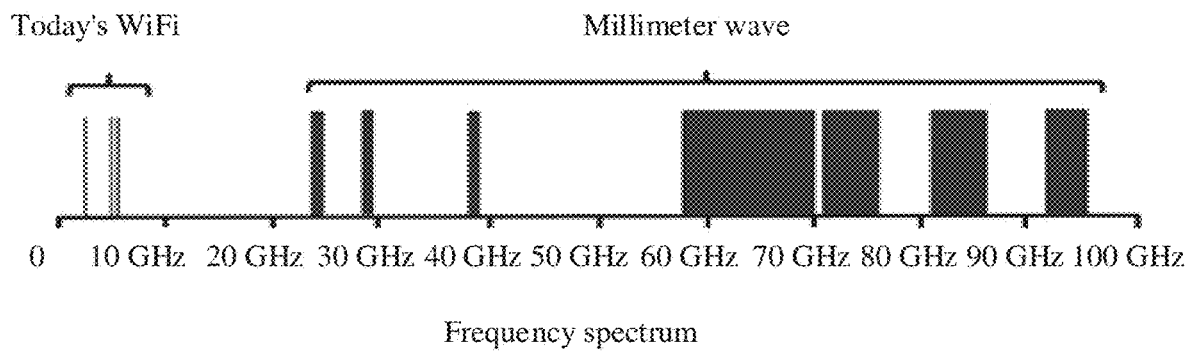
FIG. 1 is a schematic diagram of a spectrum that is used without authorization according to this application.
Figure 2:
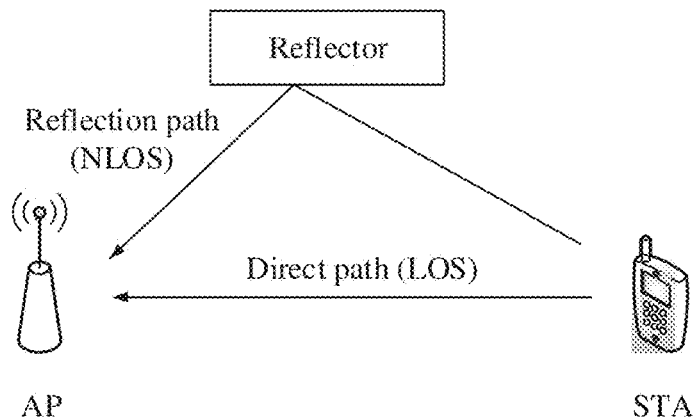
FIG. 2 is a schematic diagram of an unblocked transmission path according to an embodiment of this application.

The system includes at least one wireless device and at least one terminal device. As shown in FIG. 2, the wireless device is configured to communicate with at least one terminal device. The wireless device, such as an access point (AP), establishes a plurality of transmissible links with one terminal device, such as a station (STA), and maintains transmissibility of different links, in order to implement fast switching with another link when a link is faulty subsequently, thereby reducing a delay.

Further, the wireless device may be an access point (AP), or may be another network device, such as a base station, an enhanced base station, a relay having a scheduling function, or a device having a base station function. The base station may be an evolved NodeB (eNB) in an LTE system, or a base station in another system. This is not limited in the embodiments of this application.

The terminal device may be a mobile terminal, for example, a mobile phone (or also referred to as a "cellular" phone), and a computer that has a mobile terminal. For example, the terminal device may be a portable, pocket-sized, handheld, computer built-in, or in-vehicle mobile apparatus, and the terminal devices exchange voice and/or data with a radio access network. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively be a subscriber unit (SU), a subscriber station (SS), a mobile station (MS), a remote station (RS), a remote terminal (RT), an access terminal (AT), a user terminal (UT), a user agent (UA), a user device, or a user equipment (UE).

Figure 3:
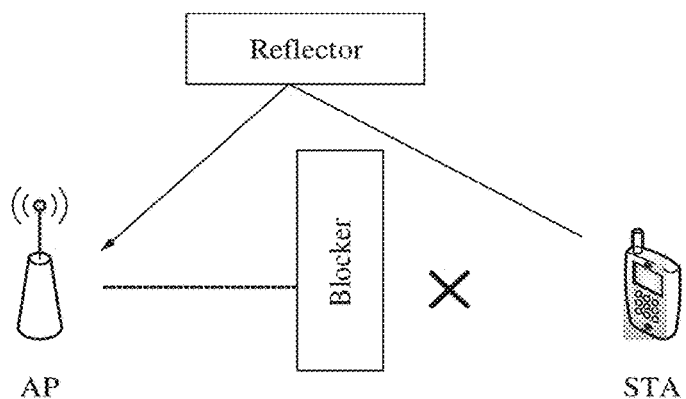
FIG. 3 is a schematic diagram of a blocked transmission path according to an embodiment of this application.

As shown in FIG. 2, there is a stable line of sight direction between the wireless device AP and the terminal device STA, in other words, there is a line of sight (LOS) between the AP and the STA. As shown in FIG. 3, because there is a barrier between the AP and the STA, there is no line of sight between the AP and the STA. A radio signal arrives at the AP through reflection or scattering from a surrounding barrier. These reflection or scattering paths are non lines of sight (NLOS).

Before data transmission, according to the method provided in this application, a plurality of links that support beamforming data transmission are trained between a same pair of AP and STA, including the LOS and the NLOS. The method supports more than two links and is not limited to requiring the LOS. In addition, the method provided in the embodiments of this application may be applicable to device-to-device (D2D) data transmission, for example, an AP and an AP, a STA and a STA, and a STA and an AP. This is not limited in the embodiments of the present disclosure.

In a data transmission process, the method may maintain transmissibility of a plurality of links simultaneously, and dynamically adjust link resource allocation based on real-time monitoring of a channel and data transmission. In each embodiment of this application, an allocated link resource that is dynamically adjusted is a slot, and a time-frequency resource is allocated in a time division duplex (TDD) manner. Optionally, the method may also be applicable to frequency and code.

When a fault occurs or transmission link sending is abnormal, for example, a link shown in FIG. 3 is blocked, and this causes transmission signal quality to be degraded. When a time-frequency resource is allocated, a time-frequency resource corresponding to the link is allocated as far as possible to a link that is not faulty (for example, the NLOS), thereby ensuring normal execution of an upper-layer service, and processing and recovering a faulty link at the same time.

Embodiment 1

Figure 4:
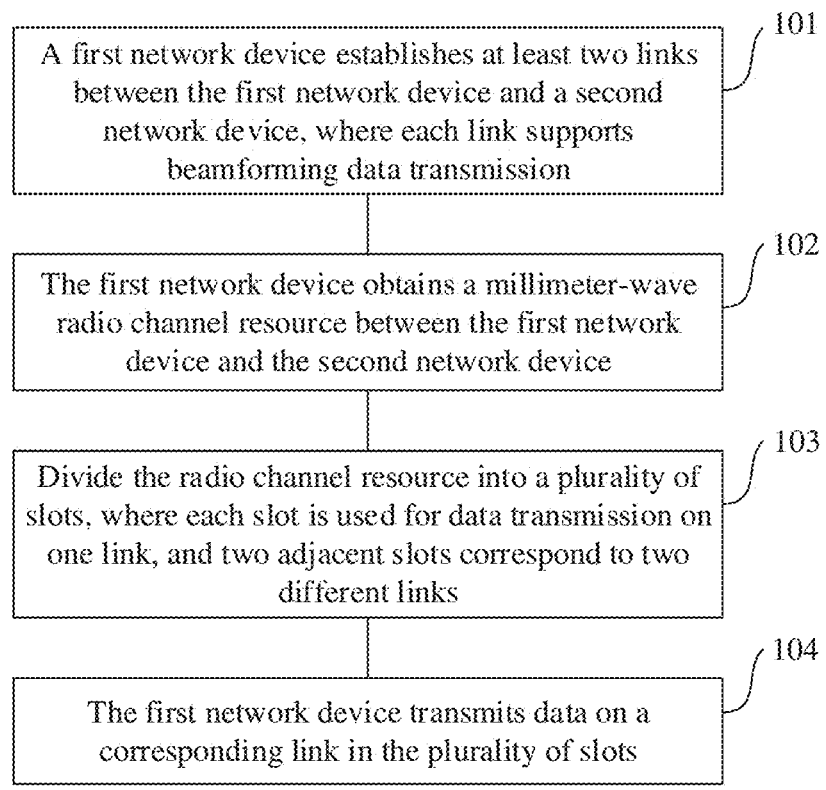
FIG. 4 is a schematic flowchart of a channel resource allocation method according to an embodiment of this application.

As shown in FIG. 4, this embodiment provides a method for allocating a time-frequency resource on a millimeter-wave radio channel. The method includes the following steps.

Step 101: A first network device such as an AP establishes at least two links between the AP and a second network device such as an STA, where each link supports beamforming data transmission.

The AP may establish a plurality of beamforming links between the AP and the STA through negotiation. In a possible implementation, the AP broadcasts a first message, where the first message includes capabilities of a plurality of beamforming links supported by the AP. After receiving the first message, the STA feeds back a response message to the AP, and the AP receives and interprets the response message fed back by the STA based on the first message. Then, the AP establishes the at least two links between the AP and the STA based on the response message.

Figure 5:
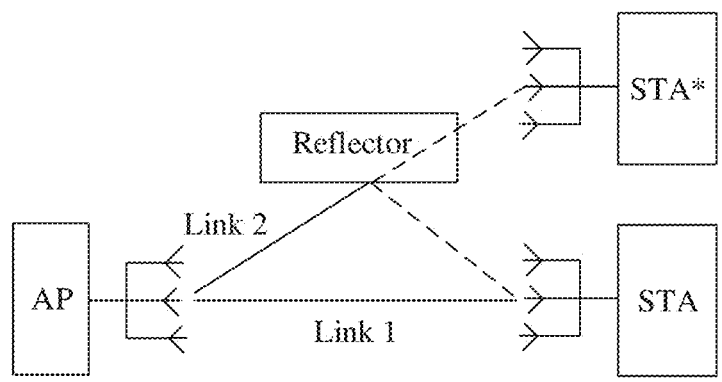
FIG. 5 is a schematic diagram of training a plurality of links by an AP according to an embodiment of this application.

In another possible implementation, the AP divides one physical STA into a plurality of virtual STAs, and each virtual STA corresponds to one beamforming path, for example, an LOS (set to a link 1) between the AP and the STA and an NLOS (set to a link 2) between the AP and a STA* shown in FIG. 5. Each virtual STA obtained through division is invisible to the AP, to be more specific, the AP considers that each virtual STA is an entity STA, and separately performs beamforming training with these entity STAs. Similarly, one physical AP may be divided into a plurality of virtual APs, and a plurality of beamforming links between each virtual AP and an entity STA may be trained.

The STA in the embodiments of this application may simultaneously train/trace a plurality of links using a virtualization technology. A key point of the virtual STA lies in that a plurality of MAC addresses can be extended for a STA device, and all virtual STAs can identify different data streams for a same device, and are externally represented as a plurality of different devices. At an AP link layer, the AP and a plurality of virtual STAs separately train links. Therefore, code at the AP link layer does not need to be changed, such that the AP link layer can be quickly compatible with an existing standard, to maintain barrier-free communication between the AP and the virtual STA.

It should be noted that in this embodiment, the foregoing two manners may be further combined. To be more specific, the AP may broadcast a capability of supporting link transmission by the virtual STA, and separately perform beamforming link training using the virtual AP and the virtual STA.

Step 102: The first network device obtains a millimeter-wave radio channel resource between the first network device and the second network device.

The millimeter-wave radio channel resource is a resource that can be allocated by the AP, and the resource that can be allocated by the AP includes a time domain resource and a frequency domain resource. Further, for the time domain resource, usually, the AP divides the time domain resource into a plurality of beacon intervals by sending a beacon, and the time domain resource may be considered as a channel resource between the AP and the STA at a time interval of each beacon interval. If the radio channel resource is a frequency domain resource, an available frequency band may be first divided into frequency subbands, and then a time domain resource is further divided on each frequency subband.

Step 103: Divide the radio channel resource into a plurality of slots, where each slot is used for data transmission on one link, and two adjacent slots correspond to two different links.

Figure 6:
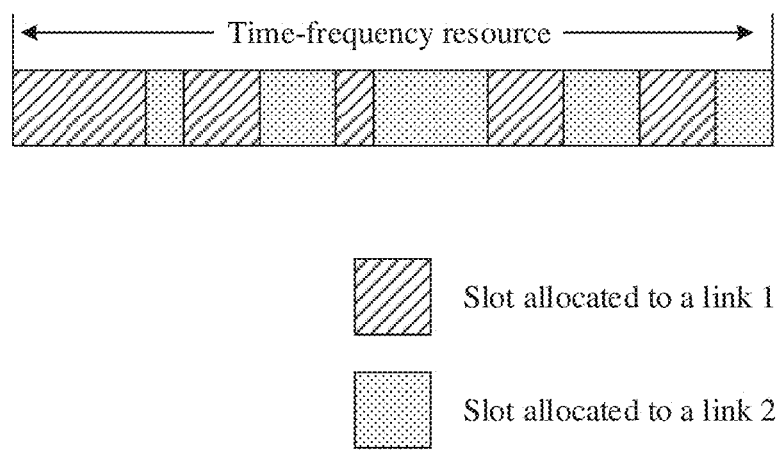
FIG. 6 is a schematic diagram of allocating slots to a plurality of links according to an embodiment of this application.

In a possible division method, the AP divides the radio channel resource into the plurality of slots in a time division duplex (TDD) manner. As shown in FIG. 6, a time-frequency resource is divided into several slots, and these slots are allocated to a link 1 and a link 2. Further, in a process of obtaining the plurality of slots through division, the AP may first obtain reference information of the STA, then determines a slot length of each link based on the reference information, and divides an entire time-frequency resource.

The reference information includes at least one of the following: a signal-to-noise ratio (SNR), a packet loss rate, channel state information (CSI), a channel quality indicator (CQI), a data packet transmission delay, or quality of service (QoS) at a system layer and an application layer.

Step 104: The first network device transmits data on a corresponding link in the plurality of slots, to maintain transmissibility of a plurality of beamforming links between the AP and the STA.

Maintaining the transmissibility of the plurality of links may be understood as transmitting different data in different slots obtained through division. To be more specific, the slots are allocated to different links for alternate use. For example, a slot 1 is used to send data on the link 1, and a slot 2 is used to send data on the link 2.

Further, in an implementation of maintaining the transmissibility of the plurality of links, the AP determines an optimal link in the at least two links and a slot corresponding to the optimal link, and the AP sends first information in the slot corresponding to the optimal link. The first information is used to perform channel estimation and data monitoring on the optimal link. To be more specific, the AP sends necessary information on the optimal link, and sends second information in a slot corresponding to a link other than the optimal link. The second information is used to maintain a heartbeat. For example, the second information includes a preamble of a data packet, a heartbeat packet/heartbeat frame, or the like.

It should be noted that in a process of maintaining transmissibility of each link, the first network device may transmit same data or different data on the plurality of established links. In addition, after dividing a time-frequency resource on a radio channel into a plurality of slots, the first network device transmits data on the optimal link, and may transmit data on another link or may not transmit data. This is not limited in this embodiment. However, it should be ensured that when a primary link (for example, the optimal link) is faulty or blocked, at least one standby link can keep smooth communication to prepare for switching.

In addition, in step 104, the AP may alternatively maintain the transmissibility of the plurality of beamforming links in a manner in which the TDD manner is combined with a manner in which necessary data is transmitted on the optimal link. In addition, data transmitted by the AP on different links may be from a same upper-layer service, or may be from different services, or may be from a hybrid mode thereof. A specific manner may be determined based on an actual situation. This is not limited in this embodiment.

According to the channel resource allocation method provided in this embodiment, the first network device divides the radio channel resource into the plurality of slots, and different slots are used for data transmission on the different links. Therefore, when detecting that a link at a current moment is faulty, the first network device may transmit data in a next slot, such that the link is quickly switched to a link that is not faulty. In this way, a link reselection process, a switching process, and a connection establishment process are avoided, a delay caused by link switching is reduced, and quality of service of a user is improved.

In addition, compared with a manner in which time-frequency resources on the entire radio channel are allocated to one link for data transmission, in the method provided in this embodiment, when a fault occurs, the link can be quickly switched in the slot obtained through division to change a beamforming direction, in order to avoid wasting the time-frequency resources corresponding to the entire link due to the fault. In the method, time-frequency resources of a system are further saved while a delay is reduced.

Optionally, in this embodiment, the foregoing method further includes a process of dynamically adjusting channel resource allocation. For example, the first network device (AP) obtains the reference information of the second network device (STA). The reference information may be obtained through negotiation between the AP and the STA, or obtained by the AP through quality monitoring on each link. Then, the AP adjusts, based on the reference information, a length of a slot allocated to each link.

The reference information includes an SNR, a packet loss rate, CSI, a CQI, a delay, QoS at a system layer and an application layer, and the like. For example, when the reference information is the SNR, a process in which the AP adjusts a slot on each link includes: if the AP detects that an SNR on a link increases, a transmission slot/time interval on the link correspondingly increases; or if an SNR decreases, a slot/time interval on the link is correspondingly shortened.

Figure 7:
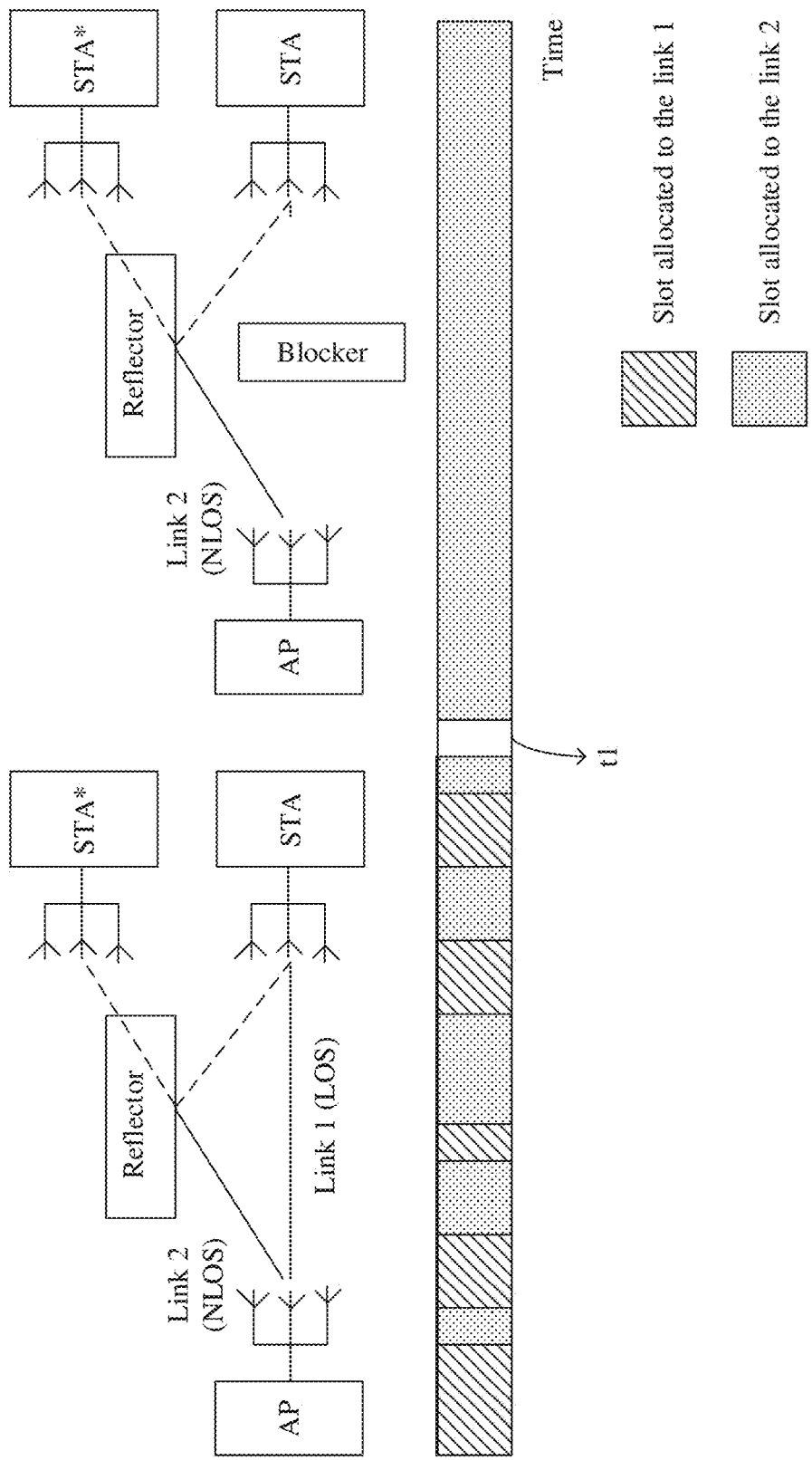
FIG. 7 is a schematic diagram of allocating slots to a link 1 and a link 2 according to an embodiment of this application.

As shown in FIG. 7, two beamforming links are established between an AP and a STA, that is, a link 1 and a link 2. When a link is faulty, for example, the AP determines, based on reference information, that the established link 1 (LOS) is faulty, a slot allocated to the link 1 (LOS) is changed to a slot corresponding to the link 2 (NLOS) that is not faulty. For example, a slot 1, a slot 3, and a slot 5 are used to transmit data on the link 1, and a slot 2, a slot 4, and a slot 6 are used to transmit data on the link 2. In a data transmission process, when it is detected that the link 1 is faulty or blocked at a moment t1, subsequent slots corresponding to the link 1 are allocated to the link 2, to avoid wasting the subsequent slots because the link 1 is faulty.

In this embodiment, when a fault occurs, a beamforming link is quickly switched by changing a slot, to avoid reselecting a link to reestablish a connection, such that an upper-layer service can be maintained continuously and without interruption.

In addition, in this embodiment, time-frequency resources on links in different beamforming directions are dynamically adjusted using the reference information, such that a system delay can be reduced, and QoS quality of service can be improved.

Optionally, the method provided in the foregoing embodiment further includes tracing each beam, to maintain transmissibility of each link. For example, the AP and the STA perform multi-beam direction tracing. A manner of implementing beam tracing includes the following.

The AP broadcasts a second message. The second message includes a capability for tracing a plurality of beams supported by the first network device. After receiving the second message, the STA feeds back a response message to the AP. The AP receives the response message fed back by the STA based on the second message, and traces at least one beamforming link between the AP and the STA based on the response message, to trace and locate a location of the STA.

Alternatively, in another possible implementation, one physical STA is divided into a plurality of virtual STAs, and each virtual STA corresponds to one beamforming path, for example, an LOS of a STA and an NLOS of a STA* shown in FIG. 5. Each virtual STA is invisible to the AP, to be more specific, the AP considers that each virtual STA is an entity STA, and separately performs beamforming training with these entity STAs.

Alternatively, the foregoing two manners are combined, to be more specific, the AP broadcasts support of the AP for the plurality of virtual STAs, and the virtual STAs separately establish a link with the AP, to implement beam tracing.

It should be noted that in this embodiment, only three beam tracing manners are listed, and another manner of implementing beam tracing may be further included. For example, a proper manner may be selected based on an actual technical scenario to implement beam tracing. This is not limited in this application.

Embodiment 2

In an embodiment, a channel resource allocation method provided in this application is described using an example in which one AP allocates a radio channel resource to one STA.

A plurality of links that support beamforming transmission are trained. The AP broadcasts a capability of the AP for supporting a plurality of links, and separately trains the plurality of links with the STA. To be more specific, the AP and the STA learn each other's capability of supporting transmission of a plurality of links, establish a plurality of links between the AP and the STA, and correspondingly train these links. As shown in FIG. 5, two links trained between the AP and the STA are a link 1 and a link 2 respectively.

The AP allocates the channel resource to the link 1 and the link 2. An implementation includes: dividing, by the AP, the channel resource into different slots in a TDD manner, where each slot represents a time interval; allocating each time interval or slot to different links; and transmitting data on the allocated links to maintain transmissibility of a plurality of links. For example, as shown in FIG. 6, different colors and stripes represent slots allocated to the link 1 and the link 2, such that an entire time-frequency resource is alternately used on the link 1 and the link 2.

Maintaining transmissibility of the link 1 and the link 2 includes the following three manners.

Figure 8A:
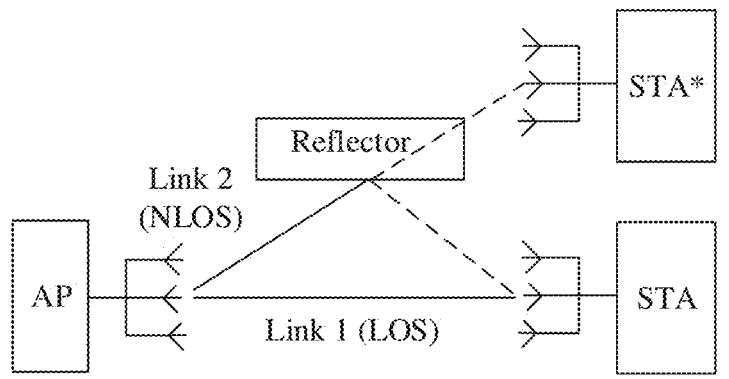
FIG. 8a is a schematic diagram of allocating a slot to a link according to an embodiment of this application.
Figure 8A:

Manner 1: Data is transmitted on a plurality of links at the same time and is aggregated at a data level. As shown in FIG. 8a, data to be sent by an AP to a STA is (1, 2, 3, 4, 5, 6, 7), and is sent using two links (a link 1 and a link 2). After an available time-frequency resource of the AP is divided into several slots, the AP sends data (1, 2) to the STA in a first slot of the link 1, and sends data (4, 5) to the STA in a second slot. Similarly, the AP sends data (3) to a STA* in a first slot of the link 2, and sends data (6, 7) to the STA* in a second slot. For a receive end, the STA and the STA* are actually a same device. Therefore, data (1, 2, 3, 4, 5, 6, 7) can be obtained through aggregation.

Figure 8B:
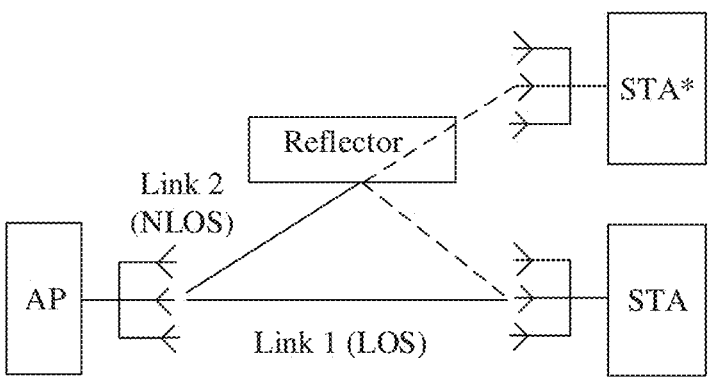
FIG. 8b is another schematic diagram of allocating a slot to a link according to an embodiment of this application.
Figure 8B:

Manner 2: Data is transmitted only using an optimal link, and another link is only used to send necessary information for channel estimation and environment monitoring, for example, a preamble is sent. As shown in FIG. 8b, the link 1 is used as the optimal link, and is used to send the necessary information. Therefore, a length of a slot allocated to the link 1 is relatively long, and a length of a slot allocated to another link, namely, the link 2, is relatively short.

Figure 8C:
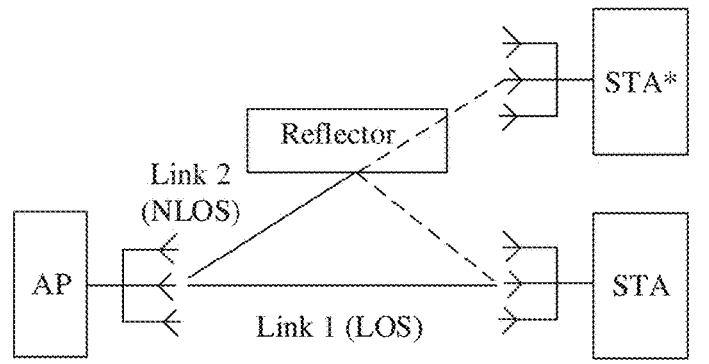
FIG. 8c is still another schematic diagram of allocating a slot to a link according to an embodiment of this application.
Figure 8C:

Manner 3: Data is transmitted only using the optimal link, and another link is only used to maintain a heartbeat. As shown in FIG. 8c, the link 1 is used as the optimal link, and is used to send the necessary information. The link 2 is only used to keep a link unblocked, and data may be sent on the link 2 or data may not be sent on the link 2. Therefore, a length of a slot allocated to the link 1 is relatively long, and a length of a slot allocated to a link used to maintain the heartbeat, namely, the link 2, is relatively short.

A channel resource of each link is dynamically adjusted. The AP obtains reference information of the STA, and adjusts, based on the reference information, lengths of slots allocated to the link 1 and the link 2. The reference information includes but is not limited to the following information: an SNR, a packet loss rate, CSI, a CQI, a data packet transmission delay, and QoS at a system layer and an application layer.

When detecting that the reference information changes, the AP or the STA may adjust the resource in a plurality of manners, thereby reducing a system delay and maintaining service continuity and stability. In this embodiment, the SNR is used as the reference information for description.

The AP may determine a next time interval based on a result of negotiation with the STA, for example, slot lengths of the link 1 and the link 2 in a beacon period. The AP queries a size of a resource required by the STA, the STA performs corresponding feedback, and the AP determines, based on a received feedback message of the STA, a length of a slot allocated to each link.

Figure 9A:
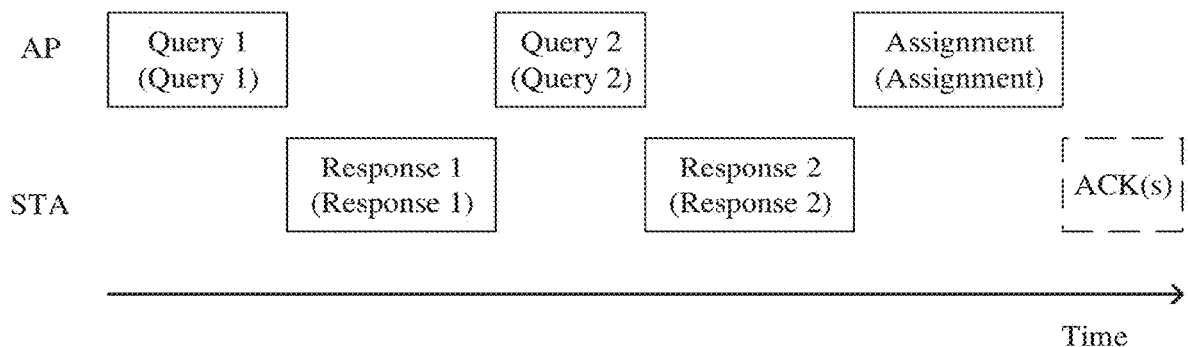
FIG. 9a is a schematic diagram of resource adjustment negotiated by an AP and a STA according to an embodiment of this application.

For example, as shown in FIG. 9a, Query 1: The AP queries the STA for a resource required by the STA, such as a volume of data that needs to be transmitted and a time length.

Response 1: The STA feeds back, based on an SNR detected on a current link, the resource required by the STA to the AP.

Query 2: The AP queries the STA* for a resource required by the STA*.

Response 2: The STA* feeds back, based on the SNR of the current link, the resource required by the STA* to the AP.

Assignment: The AP notifies, through broadcasting, the STA and the ST* of a subsequent slot allocation situation, for example, start moments, end moments, and duration of slots corresponding to the STA and the STA*.

Acknowledgement(s) (ACK(s)): The STA and the STA* feed back an ACK response to the AP. Optionally, the STA device may feed back a single ACK as an entity. Alternatively, the STA and the STA* each feed back an ACK response message to the AP.

The AP determines, based on the result of negotiation with the STA or the STA*, lengths of slots allocated to the link 1 and the link 2.

In addition, optionally, the AP may actively determine a length of a slot allocated to each link.

Figure 9B:
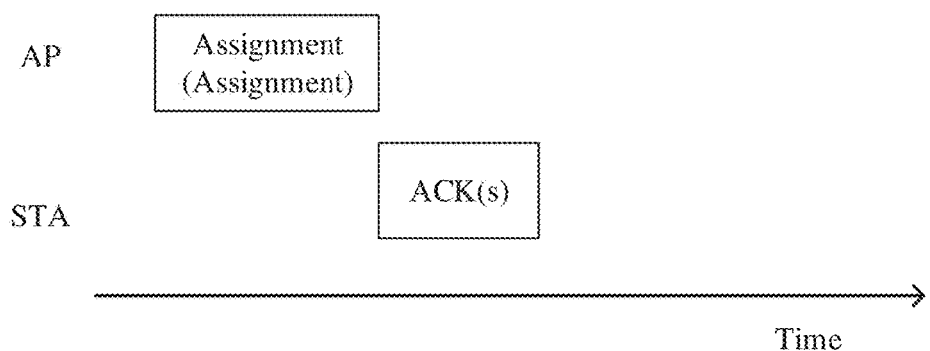
FIG. 9b is a schematic diagram that an AP determines resource adjustment according to an embodiment of this application.

For example, as shown in FIG. 9b, Assignment: The AP monitors quality of the current link, such as an SNR, determines how many resources need to be allocated to the STA and the STA* in a next allocated slot, and notifies the STA and the STA* in a broadcast form.

ACK(s): To ensure that the STA or the STA* receives a message broadcast by the AP, the STA and the STA* need to feed back an ACK to the AP, in order to indicate that the STA and the STA* know a moment and duration of communication with the AP. Optionally, in a process of feeding back the ACK to the AP, each virtual STA or STA* may be used as an entity to feed back a single ACK, or may feed back the ACK separately.

The foregoing two slot allocation manners include determining, by the AP, slot allocation through negotiation with the STA or determining, by the AP, slot allocation actively, and are determined based on an actual technical scenario. Alternatively, the foregoing two manners may be combined to dynamically adjust a time-frequency resource of each link. This is not limited in this embodiment.

Embodiment 3

This embodiment extends Embodiment 1 and Embodiment 2, and extends single transmission and single reception in the foregoing embodiment to single transmission and multiple reception, multiple transmission and single reception, and multiple transmission and multiple reception between an AP and a STA.

Figure 10:
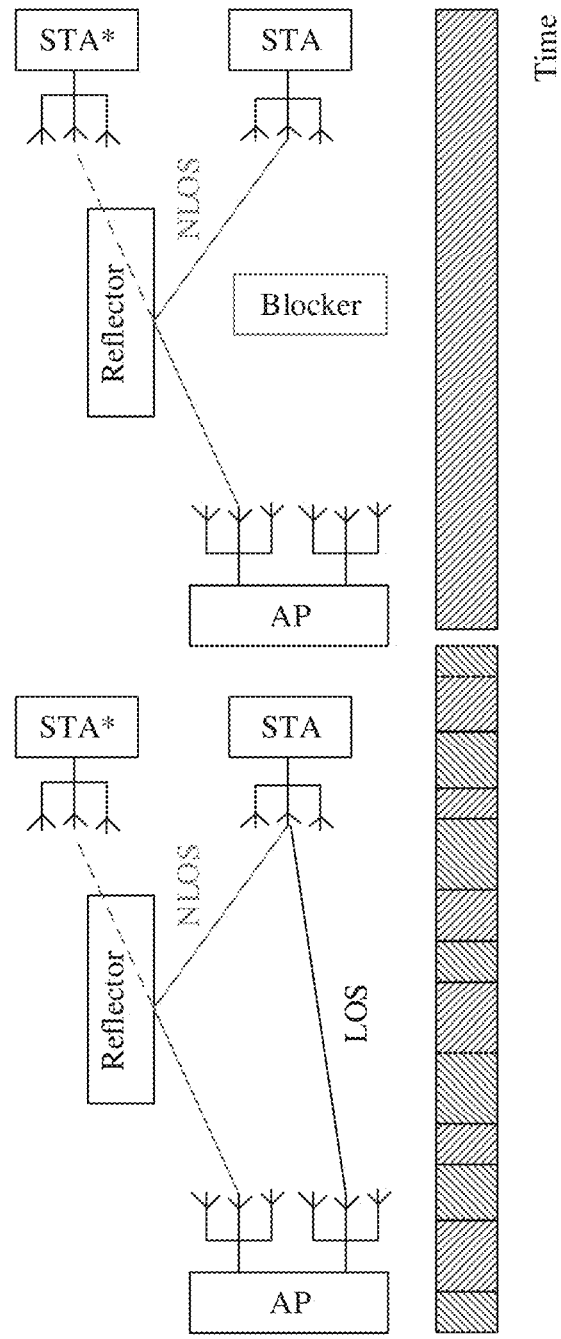
FIG. 10 is a schematic diagram of single-group antenna transmission and multi-group antenna reception according to an embodiment of this application.

In an actual case, capabilities of the AP and the STA may not be fully matched. In this case, a plurality of antenna arrays need to be configured for the sending party AP to improve transmission stability. FIG. 10 shows an example where the sending party AP has two groups of transmit antenna arrays and the receiving party STA has only one antenna array.

The AP completes training of a plurality of links, such as LOS and NLOS paths, and these links have transmissibility. In this case, transmitting, by the AP, data on a corresponding link in a plurality of divided slots includes: selecting, by the AP, one antenna array to communicate with the STA and transmit data; or transmitting, by the AP, data to a second network device using two or more antenna arrays.

Transmission mechanisms between the two or more antenna arrays include time division multiplexing, frequency division multiplexing, code division multiplexing, and spatial multiplexing.

It should be noted that, in this embodiment, single antenna array transmission and multi-group antenna array transmission may be combined to transmit data in a switching manner, in order to establish a multi-link redundancy backup between the AP and the STA, thereby improving link quality, such as an SNR and robustness.

Figure 11:
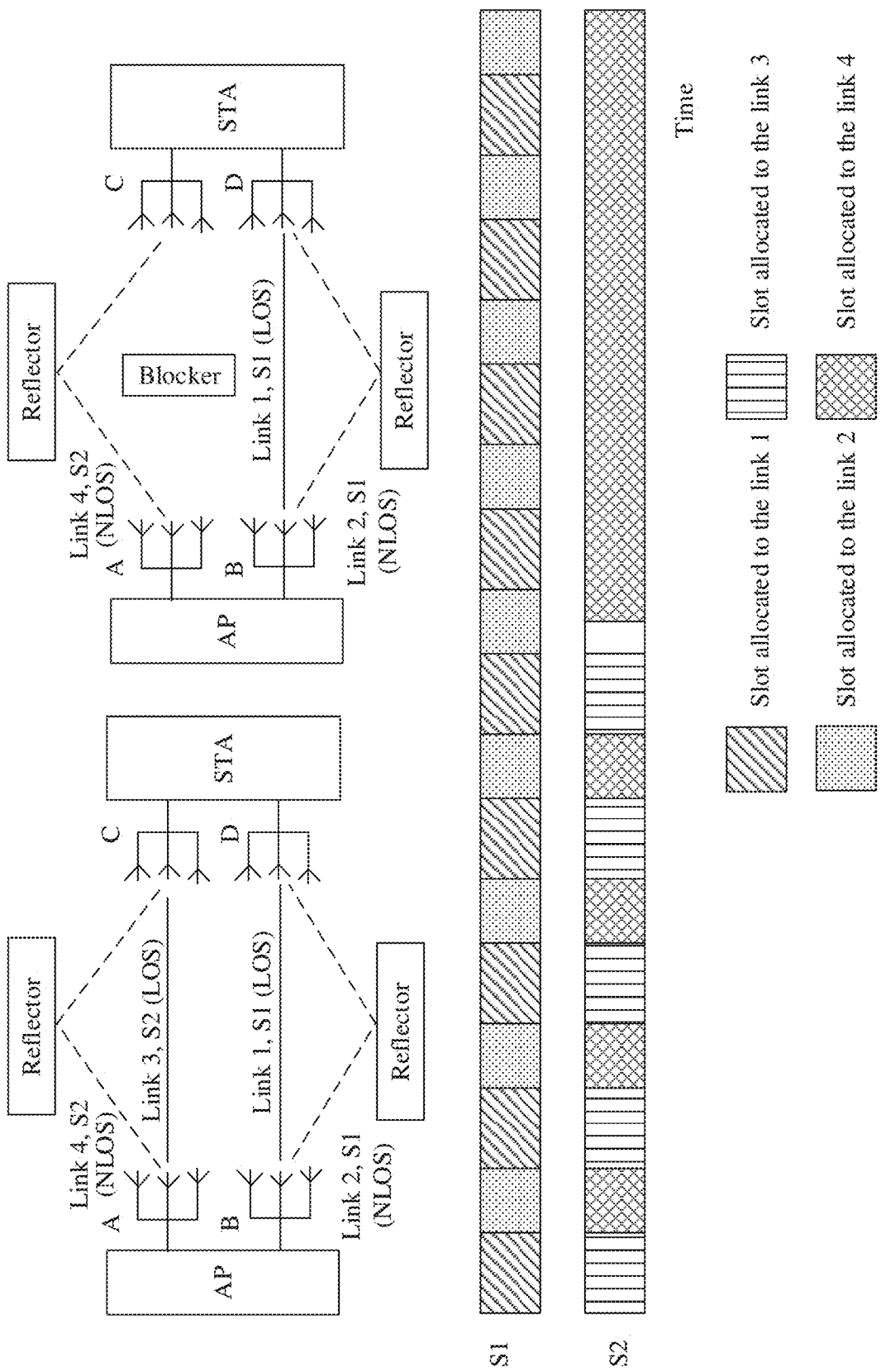
FIG. 11 is a schematic diagram of multi-group antenna transmission and multi-group antenna reception according to an embodiment of this application.

Similarly, the method may further be extended to a transmission mechanism of multi-group antenna array transmission and multi-group antenna array reception. FIG. 11 shows an example in which an AP has two groups of transmit antenna arrays (set to A and B) and a STA has two antenna arrays (set to C and D).

Two links, an LOS and an NLOS, that support beamforming are trained between the antenna array B of the AP and the antenna array D of the STA, and correspond to a time-frequency resource S1. Similarly, two links are also trained between the other antenna array A of the AP and the antenna array C of the STA, and a corresponding time-frequency resource is S2.

The AP separately allocates different slots to each link on the time-frequency resources S1 and S2. Optionally, slots are divided at intervals on the time-frequency resource S1 to a link 1 and a link 2, and slots are also divided at intervals on the time-frequency resource S2 to a link 3 and a link 4. When the link 3 in S2 is blocked, in a next slot, slots corresponding to the blocked link 3 are all allocated to the unblocked link 4, thereby ensuring that data is transmitted without interruption, implementing fast switching of beamforming links, and reducing a system delay.

Further, the antenna group arrays between the sending party and the receiving party in this embodiment may be randomly arranged and combined. To be more specific, any antenna array of the AP may communicate with the two antenna arrays of the STA, or the two antenna arrays of the AP may communicate with one antenna array of the STA at the same time (as shown in FIG. 10 in Embodiment 2). Several feasible antenna array pairing cases are listed below.
1. A-C and B-D or A-D and B-C.
2. AB-C and AB-D.
3. A-CD and B-CD.
4. A-C and AB-D or A-D and AB-C or B-C and AB-D or B-D and AB-C.
5. A-C and B-CD or A-D and B-CD or B-C and A-CD or B-D and A-CD.
6. A-CD and B-CD.

It should be noted that the antenna group pairing cases of the system formed by the AP and the STA may be dynamically adjusted based on an actual situation. In this embodiment, link training, maintaining of multi-link transmissibility, and a method for dynamically adjusting link slots are similar to that in Embodiment 1. Therefore, details are not described in this embodiment.

Corresponding to the foregoing method embodiment, an embodiment of this application further provides a corresponding apparatus embodiment, such as a network device and a terminal device.

Figure 12:
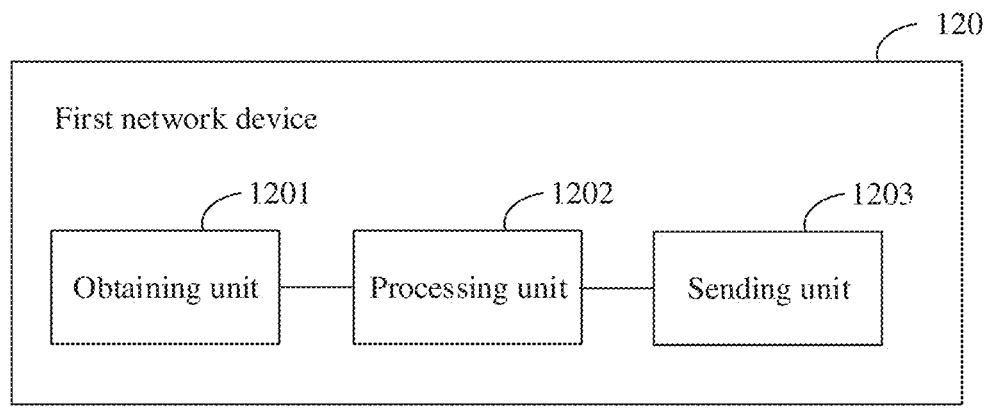
FIG. 12 is a schematic structural diagram of a first network device according to an embodiment of this application.

FIG. 12 is a schematic structural diagram of a first network device 120 according to an embodiment of the present disclosure. The first network device 120 is configured to perform the channel resource allocation method shown in FIG. 4. The first network device 120 may include an obtaining unit 1201, a processing unit 1202, and a sending unit 1203.

The processing unit 1202 is configured to establish at least two links between the first network device 120 and a second network device, where each link supports beamforming data transmission.

The obtaining unit 1201 is configured to obtain a millimeter-wave radio channel resource between the first network device 120 and the second network device.

The processing unit 1202 is further configured to divide the radio channel resource into a plurality of slots, where each slot is used for data transmission on one link, and two adjacent slots correspond to two different links.

The sending unit 1203 is configured to transmit data on a corresponding link in the plurality of slots.

Optionally, in an implementation of this embodiment, the processing unit 1202 is configured to divide the radio channel resource into a plurality of slots in a time division duplex TDD manner.

Optionally, in an implementation of this embodiment, the processing unit 1202 is further configured to determine an optimal link in the at least two links. The sending unit 1203 is further configured to: send first information in a slot corresponding to the optimal link, where the first information is used to perform channel estimation and data monitoring on the optimal link; and send second information in a slot corresponding to a link other than the optimal link, where the second information is used to maintain a heartbeat.

Optionally, in an implementation of this embodiment, the obtaining unit 1201 is further configured to obtain reference information of the second network device, where the reference information includes at least one of the following: an SNR, a packet loss rate, CSI, a CQI, a data packet transmission delay, or QoS at a system layer and an application layer. The processing unit 1202 is further configured to adjust, based on the reference information, a length of a slot allocated to each link.

Optionally, in an implementation of this embodiment, the obtaining unit 1201 is configured to obtain the reference information by negotiating with the second network device, or obtain the reference information using a monitoring result of quality of each link.

Optionally, in an implementation of this embodiment, the at least two links include a first link and a second link. The processing unit 1202 is configured to determine, based on the reference information, that when the first link is faulty, a slot allocated to the first link is changed to a slot corresponding to the second link.

Optionally, in an implementation of this embodiment, the sending unit 1203 is configured to broadcast a first message, where the first message includes capabilities of a plurality of beamforming links supported by the apparatus. The obtaining unit 1201 is configured to receive a response message fed back by the second network device based on the first message. The processing unit 1202 is further configured to establish at least two links to the second network device based on the response message.

Optionally, in an implementation of this embodiment, the second network device includes at least two virtual second network devices, and the processing unit 1202 is configured to establish a link between the first network device 120 and each virtual second network device.

Optionally, in an implementation of this embodiment, the apparatus includes at least one antenna array.

The sending unit 1203 is configured to transmit data using one antenna array, or transmit data to the second network device using two or more antenna arrays, where a transmission mechanism between the two or more antenna arrays includes time division multiplexing, frequency division multiplexing, code division multiplexing, and spatial multiplexing.

Optionally, in an implementation of this embodiment, the sending unit 1203 is further configured to broadcast a second message, where the second message includes a capability for tracing a plurality of beams supported by the apparatus. The obtaining unit 1201 is further configured to receive a response message fed back by the second network device based on the second message. The processing unit 1202 is further configured to trace the link based on the response message.

The apparatus or the first network device 120 provided in this embodiment divides the millimeter-wave radio channel resource into a plurality of slots, and different slots are used for data transmission on different links. Therefore, when it is detected that a link at a current moment is faulty, data may be transmitted in a next slot, such that the link is quickly switched to a link that is not faulty. In this way, a link reselection process, a switching process, and a connection establishment process are avoided, a delay caused by link switching is reduced, and quality of service of a user is improved.

In addition, when a fault occurs, compared with a manner in which time-frequency resources of an entire radio channel are allocated to one link for data transmission, in the manner in this embodiment, a link can be quickly switched to change a direction of beamforming using a divided slot, such that the time-frequency resources corresponding to the entire link are not wasted due to a fault, thereby reducing a delay and saving a time-frequency resource of a system at the same time.

Figure 13:
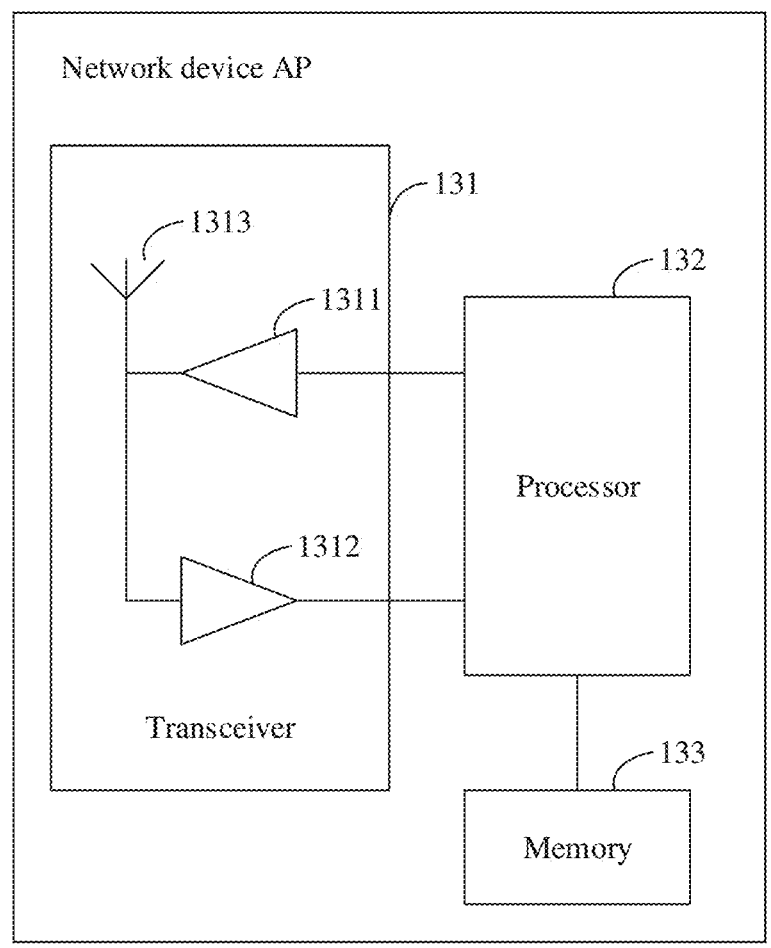
FIG. 13 is a schematic diagram of a network device AP according to an embodiment of this application.

FIG. 13 is a schematic structural diagram of a network device according to an embodiment of this application. The network device may be the AP in any one of the foregoing embodiments, and is configured to implement steps of the method in the foregoing embodiment.

As shown in FIG. 13, the network device may include a transceiver 131, a processor 132, and a memory 133. The transceiver 131 may include components such as a receiver 1311, a transmitter 1312, and an antenna 1313. The network device may further include more or fewer components, or combine some components, or have different component arrangements. This is not limited in this application.

The processor 132 is a control center of the network device, connects all parts of the entire network device using various interfaces and lines, and performs various functions of the network device and/or processes data by operating or executing a software program and/or a module stored in the memory 133 and invoking data stored in the memory 133. The processor 132 may include an integrated circuit (IC), for example, may include a single packaged IC, or may include a plurality of packaged ICs having a same function or different functions. For example, the processor 132 may include only a central processing unit (CPU), or may be a combination of a CPU, a digital signal processor (DSP), and a control chip (such as a baseband chip) in a transceiver. In various implementations of the present disclosure, the CPU may be a single computing core, or may include a plurality of computing cores.

The transceiver 131 is configured to establish a communication channel, such that the network device is connected to a receiving device, such as a STA, through a network channel, thereby implementing data transmission between the network device and a terminal device. The transceiver 131 may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, such as wideband code division multiple access (WCDMA) and/or high speed downlink packet access (HSDPA). The transceiver is configured to control communication between all the components in the terminal device, and may support direct memory access.

In different implementations of this application, transceivers in the transceiver 131 are usually presented in a form of an integrated circuit chip, and may be selectively combined without a need to include all the transceivers and corresponding antenna groups. For example, the transceiver 131 may include only a baseband chip, a radio frequency chip, and a corresponding antenna to provide a communication function in a cellular communications system. For example, the terminal device may be connected to a cellular network or the Internet using a wireless communication connection established by the transceiver, for example, using wireless local area network access or WCDMA access. In some optional implementations of this application, the communication modules, for example, the baseband module, in the transceiver may be integrated into the processor. A typical example is an APQ+MDM series platform provided by Qualcomm. The radio frequency circuit is configured to send and receive information, or receive and send a signal in a call process. For example, the radio frequency circuit receives downlink information of a network device and sends the downlink information to the processor for processing, and sends uplink-related data to the network device. Usually, the radio frequency circuit includes a well-known circuit used to perform these functions, and includes but is not limited to an antenna system, a radio frequency transceiver, one or more amplifiers, a tuner, one or more oscillators, a digital signal processor, a coder/decoder (codec) chipset, a subscriber identity module (SIM) card, a memory, and the like. In addition, the radio frequency circuit may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), a high speed uplink packet access (HSUPA) technology, long term evolution (LTE), an email, a short message service (SMS), and the like.

In the apparatus embodiment of this application, functions to be implemented by the obtaining unit 1201 and the sending unit 1203 may be implemented by the transceiver 131 of the network device, or implemented by the transceiver 131 controlled by the processor 132. A function to be implemented by the processing unit 1202 may be implemented by the processor 132.

Figure 14:
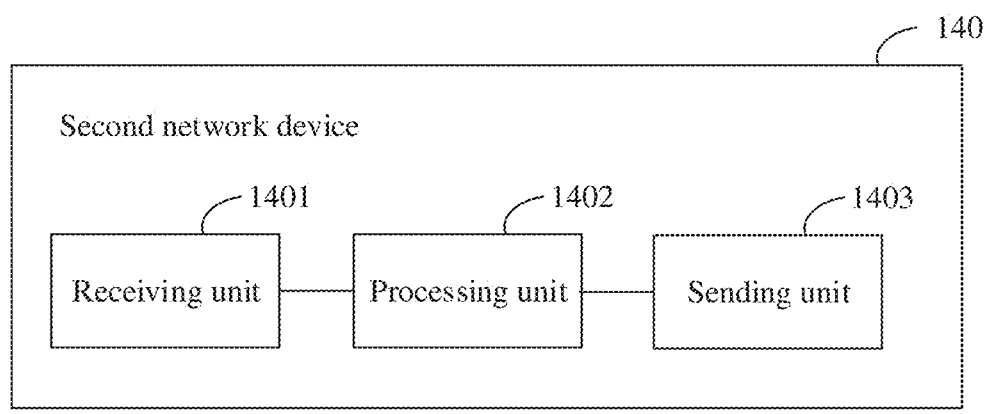
FIG. 14 is a schematic structural diagram of a second network device according to an embodiment of this application.

FIG. 14 is a schematic structural diagram of a second network device 140 according to an embodiment of this application. The second network device 140 may be the terminal in any one of the foregoing embodiments, such as a STA, and is configured to implement steps of the method in the foregoing embodiment.

As shown in FIG. 14, the second network device 140 includes a receiving unit 1401, a processing unit 1402, and a sending unit 1403. In addition, the second network device 140 may further include another unit module such as a storage unit.

The processing unit 1402 is configured to establish at least two links to a first network device, where each link supports beamforming data transmission.

The receiving unit 1401 is configured to receive information from the first network device.

The sending unit 1403 is configured to send a response message to the first network device based on the information, in order to maintain transmissibility of the plurality of links.

Further, maintaining transmissibility of the plurality of links includes: receiving, by the receiving unit 1401, first information from the first network device, where the first information is used to perform channel estimation and data monitoring on an optimal link; and on another link, receiving, by the receiving unit 1401, second information from the first network device, where the second information includes a preamble or a heartbeat packet/heartbeat frame used to maintain a heartbeat.

Optionally, in an implementation of this embodiment, the processing unit 1402 is configured to generate reference information, where the reference information includes at least one of the following: a signal-to-noise ratio (SNR), a packet loss rate, channel state information (CSI), a channel quality indicator (CQI), a data packet transmission delay, or quality of service (QoS) at a system layer and an application layer.

The sending unit 1403 is configured to send the reference information to the first network device.

Optionally, in an implementation of this embodiment, the processing unit 1402 is further configured to: virtualize a plurality of STAs; and train/trace a plurality of links simultaneously using a virtualization technology. The processing unit 1402 is configured to extend a plurality of MAC addresses, where each MAC address corresponds to one virtual STA, and each virtual STA can identify different data streams from each other, and externally appears as a plurality of different STA devices.

Optionally, in an implementation of this embodiment, the receiving unit 1401 is further configured to receive a second message from the first network device, and the processing unit 1402 is further configured to: generate a feedback response message based on the second message; and send the response message to the first network device using the sending unit 1403, in order to implement beam tracing and slot allocation of each link by the first network device.

In a hardware implementation, the second network device includes components such as a transceiver, a processor, and a memory. Functions to be implemented by the receiving unit 1401 and the sending unit 1403 may be implemented by the transceiver of the terminal, or may be implemented by the transceiver controlled by the processor. A function to be implemented by the processing unit 1402 may be implemented by the processor of the terminal.

In an implementation, this application further provides a computer storage medium, where the computer storage medium may store a program, and when the program is executed, some or all of the steps of the embodiments of the channel resource allocation method provided in this application may be included. The storage medium may be a magnetic disk, an optical disc, a read-only memory (ROM), a random access memory (RAM), or the like.

A person skilled in the art may understand that, the technologies in the embodiments of this application may be implemented by software in addition to a necessary general hardware platform. Based on such an understanding, the technical solutions in the embodiments of the present disclosure, or the part contributing to other approaches may be implemented in a form of a software product. The computer software product is stored in a storage medium, such as a ROM/RAM, a hard disk, or a compact disc, and includes several indications for instructing a computer device (which may be a personal computer, a server, a network device, or the like) to perform the methods described in the embodiments or some parts of the embodiments of the present disclosure.

For same or similar parts in the embodiments in this specification, mutual reference may be made between these embodiments. Especially, the foregoing embodiments are basically similar to a method embodiment, and therefore are described briefly. For related parts, refer to descriptions in the method embodiment.

The foregoing descriptions are implementations of this application, but are not intended to limit the protection scope of the present disclosure.

What is claimed is:

1. A channel resource allocation method, comprising:
   establishing, by a first network device, at least two links between the first network device and a second network device, wherein each of the at least two links supports beamforming data transmission;
   obtaining, by the first network device, a millimeter-wave radio channel resource between the first network device and the second network device;
   dividing the millimeter-wave radio channel resource into a plurality of slots, wherein each slot is for data transmission on one link, and wherein two adjacent slots correspond to two different links; and
   transmitting, by the first network device, data on a corresponding link in the plurality of slots, wherein transmitting the data comprises:
      sending, by the first network device, first information directly to the second network device via one of the at least two links;
      sending, by the first network device, second information directly to the second network device via another one of the least two links;
      determining, by the first network device, an optimal link in the at least two links;

sending, by the first network device, the first information to the second network device in a first slot corresponding to the optimal link, wherein the first information is for performing channel estimation and data monitoring on the optimal link;

sending the second information to the second network device in a second slot corresponding to a link other than the optimal link, wherein the second information is to maintain transmissibility between the first network device and the second network device;

sending, by the first network device, the data directly to the second network device via the optimal link; and continuing, by the first network device when the optimal link becomes faulty, to send the data directly to the second network device via the link other than the optimal link.

2. The channel resource allocation method according to claim 1, wherein dividing the millimeter-wave radio channel resource comprises dividing, by the first network device, the millimeter-wave radio channel resource into the plurality of slots in a time-division duplex (TDD) manner.

3. The channel resource allocation method according to claim 1, wherein a length of the second slot is shorter than a length of the first slot.

4. The channel resource allocation method according to claim 1, further comprising:

obtaining, by the first network device, reference information of the second network device, wherein the reference information comprises at least one of a signal-to-noise ratio (SNR), a packet loss rate, channel state information (CSI), a channel quality indicator (CQI), a data packet transmission delay, or a quality of service (QoS) at a system layer and an application layer; and adjusting, by the first network device based on the reference information, a length of a slot allocated to each link.

5. The channel resource allocation method according to claim 4, further comprising using, by the first network device, the reference information to dynamically adjust time-frequency resources on links in different beamforming directions, wherein obtaining the reference information comprises:

obtaining, by the first network device, the reference information by negotiating with the second network device; or obtaining the reference information using a monitoring result of quality of each link.

6. The channel resource allocation method according to claim 1, wherein the at least two links comprise a first link and a second link, wherein the channel resource allocation method further comprises:

obtaining, by the first network device, reference information of the second network device;

changing, by the first network device based on the reference information, a third slot to a fourth slot when a beamforming transmission path in the first link between the first network device and the second network device is blocked, wherein the third slot is allocated to the first link, and wherein the fourth slot is adjacent to the third slot and corresponds to the second link; and sending, the first network device, the first information directly to the second network device via the second link after changing the third slot to the fourth slot.

7. The channel resource allocation method according to claim 1, wherein establishing the at least two links comprises:

broadcasting, by the first network device, a first message, wherein the first message comprises capabilities of a plurality of beamforming links supported by the first network device;

receiving, by the first network device, a response message from the second network device based on the first message; and establishing, by the first network device, the at least two links between the first network device and the second network device based on the response message.

8. The channel resource allocation method according to claim 1, wherein the second network device comprises at least a first virtual terminal device and a second virtual terminal device, and wherein establishing the at least two links between the first network device and the second network device comprises:

establishing, by the first network device, a line of sight (LOS) beamforming path between the first network device and the first virtual terminal device; and establishing a non-LOS beamforming path between the first network device and the second virtual terminal device.

9. The channel resource allocation method according to claim 1, wherein the first network device comprises at least one antenna array, wherein transmitting the data comprises simultaneously transmitting, by the first network device, data to the second network device on the at least two links using two or more antenna arrays, and wherein a transmission mechanism between the two or more antenna arrays comprises time division multiplexing, frequency division multiplexing, code division multiplexing, and spatial multiplexing.

10. The channel resource allocation method according to claim 1, further comprising:

broadcasting, by the first network device, a second message, wherein the second message comprises a capability for tracing a plurality of beams supported by the first network device;

receiving, by the first network device, a response message from the second network device based on the second message; and tracing, by the first network device, the link based on the response message.

11. A channel resource allocation apparatus, comprising:
a memory configured to store instructions; and
a processor coupled to the memory and configured to execute the instructions to:

establish at least two links between the channel resource allocation apparatus and a second network device, wherein each of the at least two links supports beamforming data transmission;

obtain a millimeter-wave radio channel resource between the channel resource allocation apparatus and the second network device;

divide the millimeter-wave radio channel resource into a plurality of slots, wherein each slot is for data transmission on one link, and wherein two adjacent slots correspond to two different links; and transmit data on a corresponding link in the plurality of slots, wherein transmitting the data comprises:
sending first information directly to the second network device via one of the at least two links;

sending second information directly to the second network device via another one of the least two links;

determining, by the first network device, an optimal link in the at least two links;

sending, by the first network device, the first information to the second network device in a first slot corresponding to the optimal link, wherein the first information is for performing channel estimation and data monitoring on the optimal link;

sending the second information to the second network device in a second slot corresponding to a link other than the optimal link, wherein the second information is to maintain transmissibility between the first network device and the second network device;

sending y the first network device, the data directly to the second network device via the optimal link; and continuing, by the first network device when the optimal link becomes faulty, to send the data directly to the second network device via the link other than the optimal link.

12. The channel resource allocation apparatus according to claim 11, wherein the processor-executable instructions, when executed by the processor, further cause the processor to divide the millimeter-wave radio channel resource into the plurality of slots in a time-division duplex (TDD) manner.

13. The channel resource allocation apparatus according to claim 11, wherein a length of the second slot is shorter than a length of the first slot.

14. The channel resource allocation apparatus according to claim 11, wherein the processor-executable instructions, when executed by the processor, further cause the processor to:

obtain reference information of the second network device, wherein the reference information comprises at least a signal-to-noise ratio (SNR) at a system layer and an application layer; and adjust, based on the reference information, a length of a slot allocated to a link such that the processor increases or decreases the length of the slot when the reference information indicates that the SNR on the link increases or decreases, respectively.

15. The channel resource allocation apparatus according to claim 14, wherein the processor-executable instructions, when executed by the processor, further cause the processor to:

obtain the reference information by negotiating with the second network device; or obtain the reference information using a monitoring result of quality of each link.

16. The channel resource allocation apparatus according to claim 14, wherein the processor-executable instructions, when executed by the processor, further cause the processor to broadcast a first message, and wherein the first message comprises capabilities of a plurality of beamforming, links supported by the channel resource allocation apparatus.

17. The channel resource allocation apparatus according to claim 16, wherein the processor-executable instructions, when executed by the processor, further cause the processor and transceiver to:

receive a response message from the second network device based on the first message; and establish the at least two links between the channel resource allocation apparatus and the second network device based on the response message.

18. The channel resource allocation apparatus according to claim 11, further comprising at least one antenna array, wherein the transceiver is configured to:

transmit data using one antenna array; or transmit data to the second network device using two or more antenna arrays.

19. The channel resource allocation apparatus according to claim 11, wherein the processor-executable instructions, when executed by the processor, further cause the processor and transceiver to:

broadcast a second message, wherein the second message comprises a capability for tracing a plurality of beams supported by the channel resource allocation apparatus;

receive a response message from the second network device based on the second message; and trace the link based on the response message.

20. The channel resource allocation apparatus according to claim 18, wherein a transmission mechanism between the two or more antenna arrays comprises time division multiplexing, frequency division multiplexing, code division multiplexing, and spatial multiplexing.

* * * * *

UNITED STATES PATENT AND TRADEMARK OFFICE
CERTIFICATE OF CORRECTION

| | |
|---|---|
| PATENT NO. | : 11,540,292 B2 |
| APPLICATION NO. | : 16/773453 |
| DATED | : December 27, 2022 |
| INVENTOR(S) | : Han Xu and Yan Zeng |

It is certified that error appears in the above-identified patent and that said Letters Patent is hereby corrected as shown below:

In the Claims

Claim 11, Column 21, Line 17: "sending y the" should read "sending by the"

Signed and Sealed this
Fourteenth Day of February, 2023

*Katherine Kelly Vidal*

Katherine Kelly Vidal
*Director of the United States Patent and Trademark Office*